(12) United States Patent
Matsui et al.

(10) Patent No.: US 7,787,192 B2
(45) Date of Patent: Aug. 31, 2010

(54) LENS UNIT AND PHOTOGRAPHING APPARATUS

(75) Inventors: Kazuaki Matsui, Osaka (JP); Yoshifumi Mitani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 206 days.

(21) Appl. No.: 11/880,819

(22) Filed: Jul. 24, 2007

(65) Prior Publication Data
US 2008/0030873 A1 Feb. 7, 2008

(30) Foreign Application Priority Data
Aug. 2, 2006 (JP) ............................ 2006-210680

(51) Int. Cl.
*G02B 15/14* (2006.01)
*G02B 7/02* (2006.01)
(52) U.S. Cl. .................... 359/696; 359/813; 359/823
(58) Field of Classification Search .............. 359/696, 359/819, 699, 822–823, 826, 811, 813–815, 359/687–688, 690, 676, 795
See application file for complete search history.

(56) References Cited

U.S. PATENT DOCUMENTS

| | | | |
|---|---|---|---|
| 5,489,958 A * | 2/1996 | Katagiri et al. ............ | 396/349 |
| 6,560,036 B2 * | 5/2003 | Takahashi et al. .......... | 359/688 |
| 6,618,212 B2 | 9/2003 | Chikami et al. | |
| 6,850,373 B2 | 2/2005 | Mihara et al. | |
| 2006/0285221 A1 * | 12/2006 | Bito et al. .................. | 359/676 |
| 2007/0183065 A1 * | 8/2007 | Chigasaki et al. .......... | 359/819 |
| 2007/0183766 A1 * | 8/2007 | Miyamori et al. ............ | 396/55 |

FOREIGN PATENT DOCUMENTS

| | | |
|---|---|---|
| JP | 11-119078 | 4/1999 |
| JP | 2000-131610 | 5/2000 |
| JP | 2004-102089 | 4/2004 |

* cited by examiner

*Primary Examiner*—Scott J Sugarman
*Assistant Examiner*—Dawayne A Pinkney
(74) *Attorney, Agent, or Firm*—Brinks Hofer Gilson & Lione

(57) ABSTRACT

A lens unit includes: a first lens group arranged in a first optical axis direction of the lens unit, on which a light flux from an object is incident; a second lens group provided closer to an image side than the first lens group and arranged in a second optical axis direction; a bending section provided between the first and the second lens groups, which bends the first optical axis in the second optical axis direction, wherein the first and second lens groups are movable in the respective optical axes when a zooming operation is carried out; an actuator which drives the first and second lens groups; a first drive mechanism which moves the first lens group; a second drive mechanism which moves the second lens group; and a coupling member which concurrently transmits drive force from the actuator to the first and second drive mechanisms.

17 Claims, 20 Drawing Sheets

LENS UNIT AND PHOTOGRAPHING APPARATUS

This application is based on Japanese Patent Application No. 2006-210680 filed on Aug. 2, 2006, which is incorporated hereinto by reference.

BACKGROUND OF INVENTION

This invention relates to a lens unit and a photographing apparatus, and relates in particular to a lens unit equipped with a zooming mechanism of a bending optical system.

In recent years, as personal computers have become more widely used, digital cameras in which images can be easily taken in to personal computers have also become widespread. In addition, it is becoming commonplace for digital cameras to be incorporated into information processing devices such as mobile computers, cellular phones, and personal digital assistants (PDAs). As digital cameras have become more widespread, there has been a desire for more compact digital cameras, and the lens unit needs to be even more compact. There is also a demand for a high magnification zoom lens and a zooming mechanism that can be used with the high magnification zoom lens is needed.

As a result, it has been proposed that in order to make the lens unit more compact, the depth direction of the digital camera is shortened without changing the total length of the photographing lens even when zooming is done, and thereby achieve compactness (Unexamined Japanese Patent Application Publication No. 2000-131610 and U.S. Pat. No. 6,850,373B2). These have a bending member on the optical path, and after the optical path is bent by about 90 degrees, an optical image is formed on the image pickup element using successive lens groups.

However, although the lens unit is definitely made more compact in the two documents described above, the variable power ratio of the photographic lens is small because zooming is performed by moving lens located on the image pickup element side from the bending member.

In order to solve this problem, a high magnification zooming lens has been proposed in which zooming is performed by moving lens located on the image pickup element side from the bending member and lens located on the object side from the bending member (Unexamined Japanese Patent Application Publication No. 2004-102089).

However, in the zoom lens described in Unexamined Japanese Patent Application Publication No. 2004-102089, aberration is favorably corrected in high variable power, and a high performance optical system is disclosed, but a mechanism for moving the lens that are arranged in the vicinity of the bending member for zooming is not disclosed, and the object side lens projects out from the digital camera and this causes the camera to be bulky.

SUMMARY OF THE INVENTION

The objects of the present invention are to provide a moving mechanism for zooming which moves the lens groups with high precision in the bending optical zooming lens and also to provide a compact lens unit in which the moving mechanism for zooming has a simple structure.

The foregoing problems are solved by any one of the following structures.

1. A lens unit is provided with a plurality of lens groups, which includes a first lens group arranged in the first optical axis direction, on which a light flux from an object is incident; a second lens group arranged in the second optical axis direction and positioned closer to an image side than the first lens group; a bending section positioned between the first lens group and the second lens group, which bends the first optical axis in the second optical axis direction, wherein the first lens group and the second lens group are movable in the respective optical axis directions at the time of zooming; an actuator which drives the first lens group and the second lens group; a first drive mechanism which moves the first lens group; a second drive mechanism which moves the second lens group; and a coupling member which simultaneously transmits drive force from the actuator to the first drive mechanism and the second drive mechanism.

2. A lens unit provided with: a first holding member that holds a first lens group arranged in the first optical axis direction, on which a light flux from an object is incident, wherein the first holding member is moved along the first optical axis at the time of zooming; a second holding member that holds a second lens group positioned closer to an image side than the first lens group arranged in the second optical axis direction, wherein the second holding member is moved along the second optical axis at the time of zooming; a bending section positioned between the first lens group and the second lens group, which bends the first optical axis in the second optical axis direction; one actuator arranged on the second optical axis side, which drives the first holding member and the second holding member; a first drive mechanism which moves the first holding member; a second drive mechanism which moves the second holding member; and a coupling member which transmits drive force from the actuator to the first drive mechanism and the second drive mechanism, wherein the first drive mechanism includes an arm which has a rotation axis, the rotation axis of the arm is closer to the image side than the bending section, one end of the arm is coupled with the first holding member, the arm is rotated about the rotation axis by the drive force from the coupling member, and the first holding member moves along the first optical axis.

BRIEF DESCRIPTION OF THE DRAWINGS

FIG. 1(a) is a schematic perspective view, while FIG. 1(b) is a rear view of the outside of the digital camera of this invention.

PREFERRED EMBODIMENTS OF THE INVENTION

Figure 1:
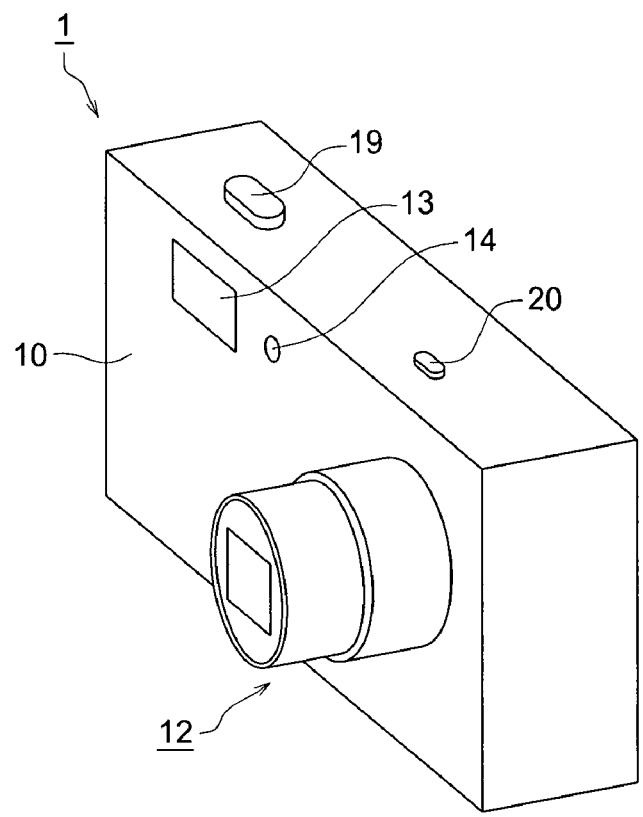
Figure 1:
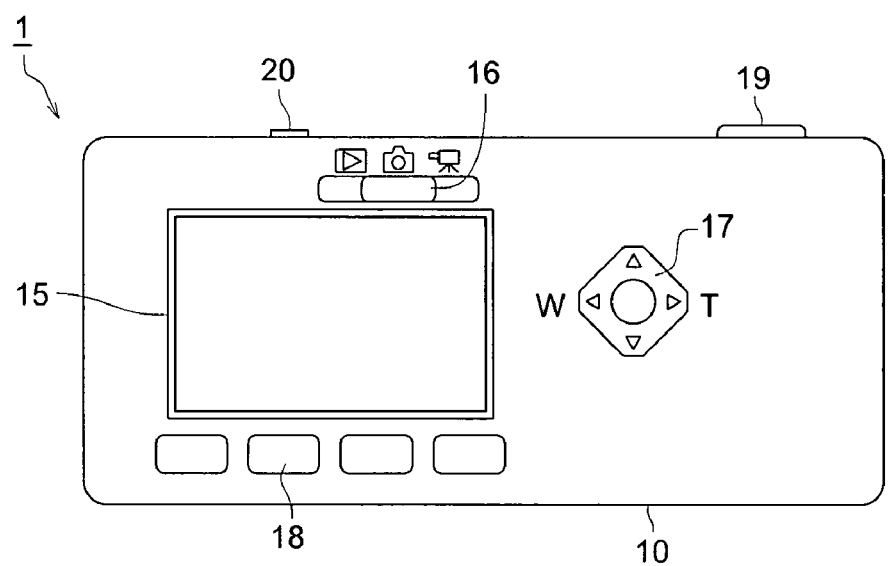

The embodiments of this invention will be described with reference to the drawings. The external view of the digital camera 1 is shown as a schematic view in FIGS. 1(a) and 1(b). FIG. 1(a) is a perspective view and FIG. 1(b) is a rear view.

The digital camera 1 is provided with a substantially rectangular camera body 10 and a lens unit 12 which is used by being projected from the camera body 10 at the time of photographing. The projection direction of the lens unit 12 is the depth direction, while the width direction of the camera body 10 is the width direction, and the vertical direction in FIGS. 1(a) and 1(b) is the longitudinal direction.

The digital camera 1 is provided with a lens unit 12, a flash emission section 13 and a self timer lamp 14 at its front surface, and a display section 15, a mode setting switch 16, a cross-shaped key 17 and a plurality of operation keys 18 at its back surface and a release button 19 and a power source button 20 at its top surface.

The lens unit 12 is the zoom lens, and when it is at the operating position, one portion of the lens projects from the front surface of the camera body 10 and then projects further when zooming is done from the wide-angle end to the telephoto end and the remaining lens portion is bent at substantially right angles to the optical axis by the bending member which is described hereinafter and arranged in the lateral direction inside the camera body 10. In addition, the portion of the lens that projects at the operating position is collapsed at the non-operating position when the photographing is not being done and is stored in the storing position inside the camera body 10.

The flash emission section 13 emits flash which irradiates an object. The self timer lamp 14 indicates that self-timed photography by blinking is in preparation.

The display section 15 which is at the rear surface comprises a liquid crystal display device, and in addition to the photographed image, the setting status of the digital camera 1 and various information for operation is displayed. The mode setting switch 16 is a slide type switch and is used in setting the operation modes such as photographing and playing for the digital camera. The cross-shaped key 17 has four contact points which are up, down, left and right, and is used in moving the cursor displayed on the display section 15. The cross-shaped key 17 is also used for adjusting the focal point distance of the lens unit 12. The operation key 18 switches the items to be displayed in the display section 15 and is used for setting related to selection of the displayed items and functions of the digital camera 1. The release button 19 operates at 2 levels and the half pressed state of the release button 19 gives instructions for preparation for photography of the image to be recorded, and the fully pressed state of the release button 19 gives instruction for photographing of the image to be recorded.

Figure 2:
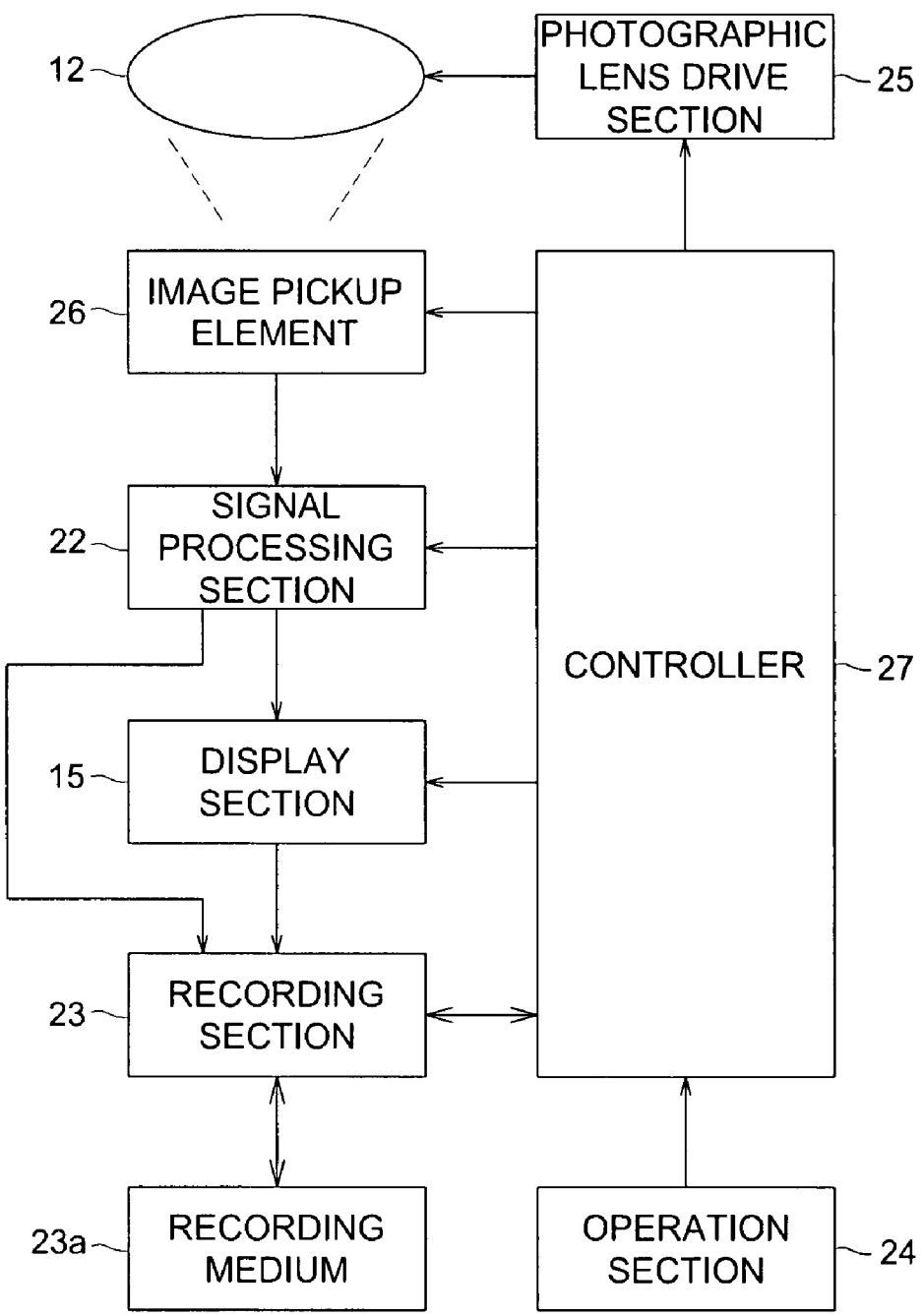
FIG. 2 is a schematic view of the structure of the digital camera of the invention.

FIG. 2 is a schematic view showing the structure of the digital camera 1. The digital camera 1 has a lens unit 12 and a display section 15 as well as a image pickup element 26, a signal processing section 22, a recording section 23, an operating section 24, a photographing lens drive section 25 and a control section 27. The image pickup element 26 is a CCD area sensor and it outputs signals which display the amount of light received for each pixel. The image processing section 22 processes the output signals from the image pickup element 26 and creates image data which displays the photographed image. The recording section 23 records the image data created by the image processing section 22 in a removable recording medium 23a and image data is read from the recording medium 23a for display of image reproduction and display. The operation section 24 comprises the mode setting switch 16, the cross-shaped key 17, the operation key 18, the release button 19 and the power button 20 and the information pertaining to the button operated by the user is transmitted to the control section 27.

The photographing lens control 25 controls the driving of motors such as the zoom motor, the focus motor, the shutter and aperture motor for adjusting light exposure amount. The photographing lens drive section 25 may also be provided at the lens unit 12.

The control section 27 has function which perform a series of operations which include controlling the operation of each part of the digital camera 1 based on a control program, and when the release button is half pressed, preparations for photographing the object such as setting of the exposure control value and focus adjustment are performed and when the release button 19 is fully pressed, the image pickup element 26 is exposed and the image signals obtained due to the exposure are subjected to prescribed image processing and recorded on the recording medium 23a.

First Embodiment

The structure of the lens unit 12 is described as the first embodiment.

Figure 3:
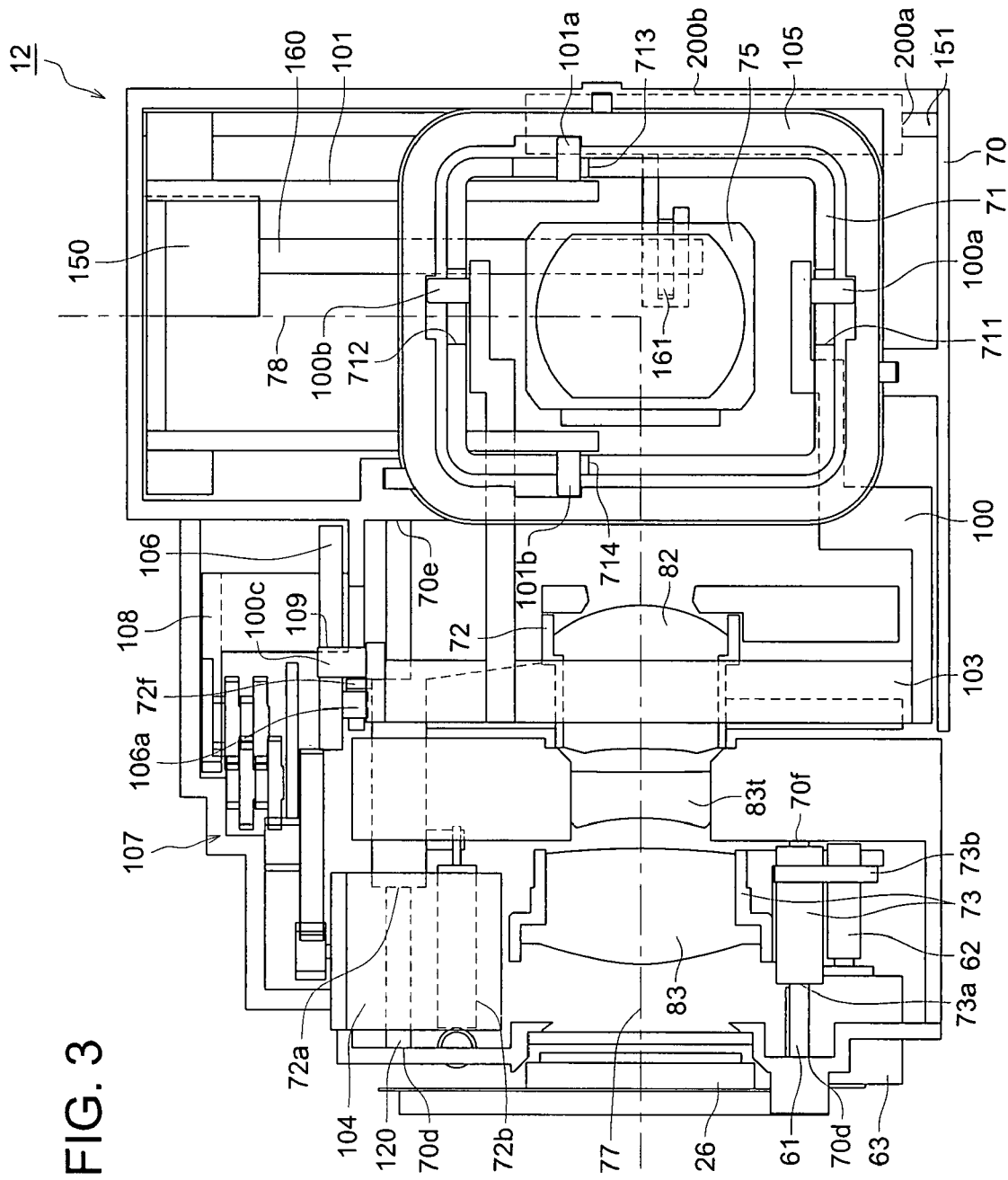
FIG. 3 is front view of the lens unit of the first embodiment of this invention.
Figure 4:
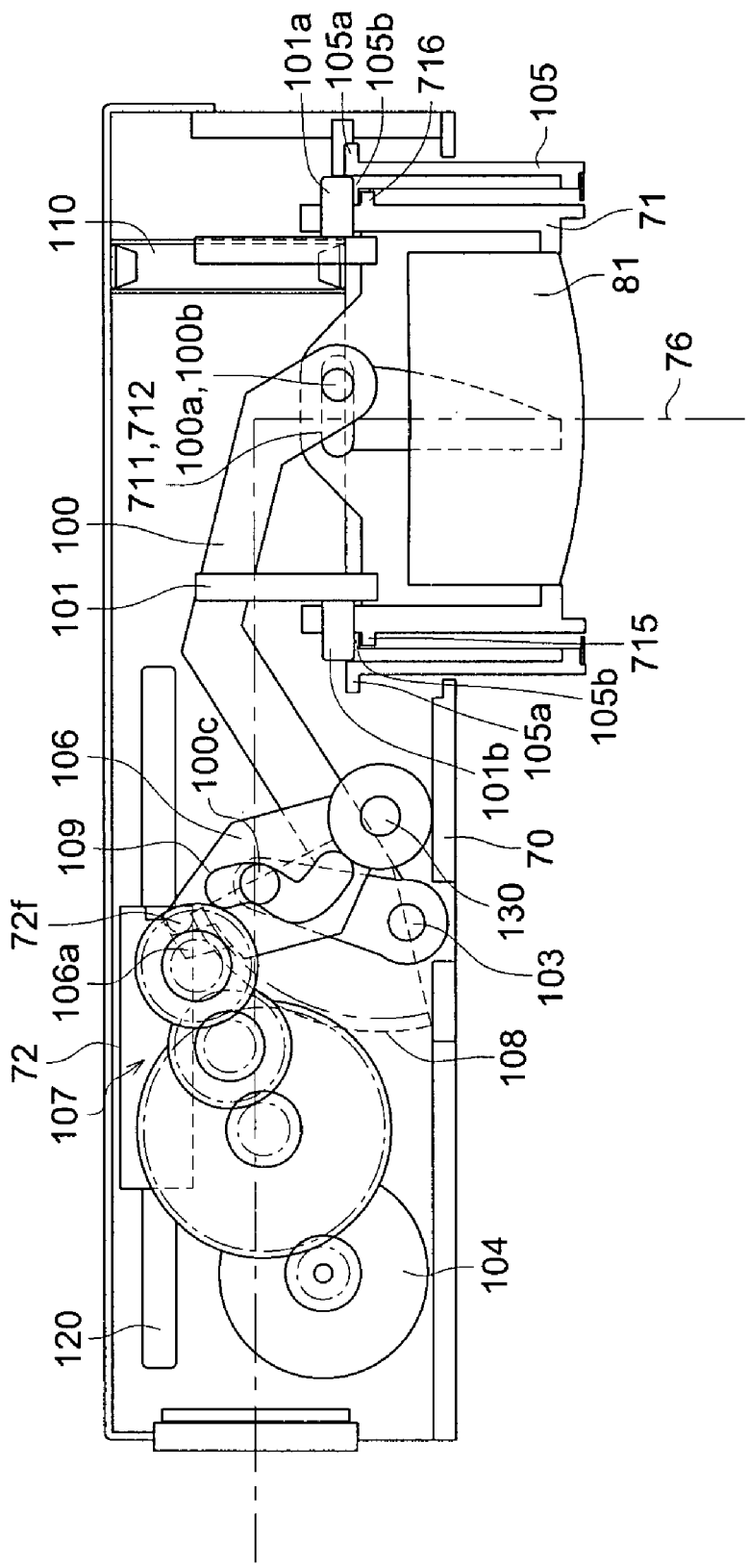
FIG. 4 is a side view of the lens unit of the first embodiment of this invention in the wide-angle state.
Figure 5:
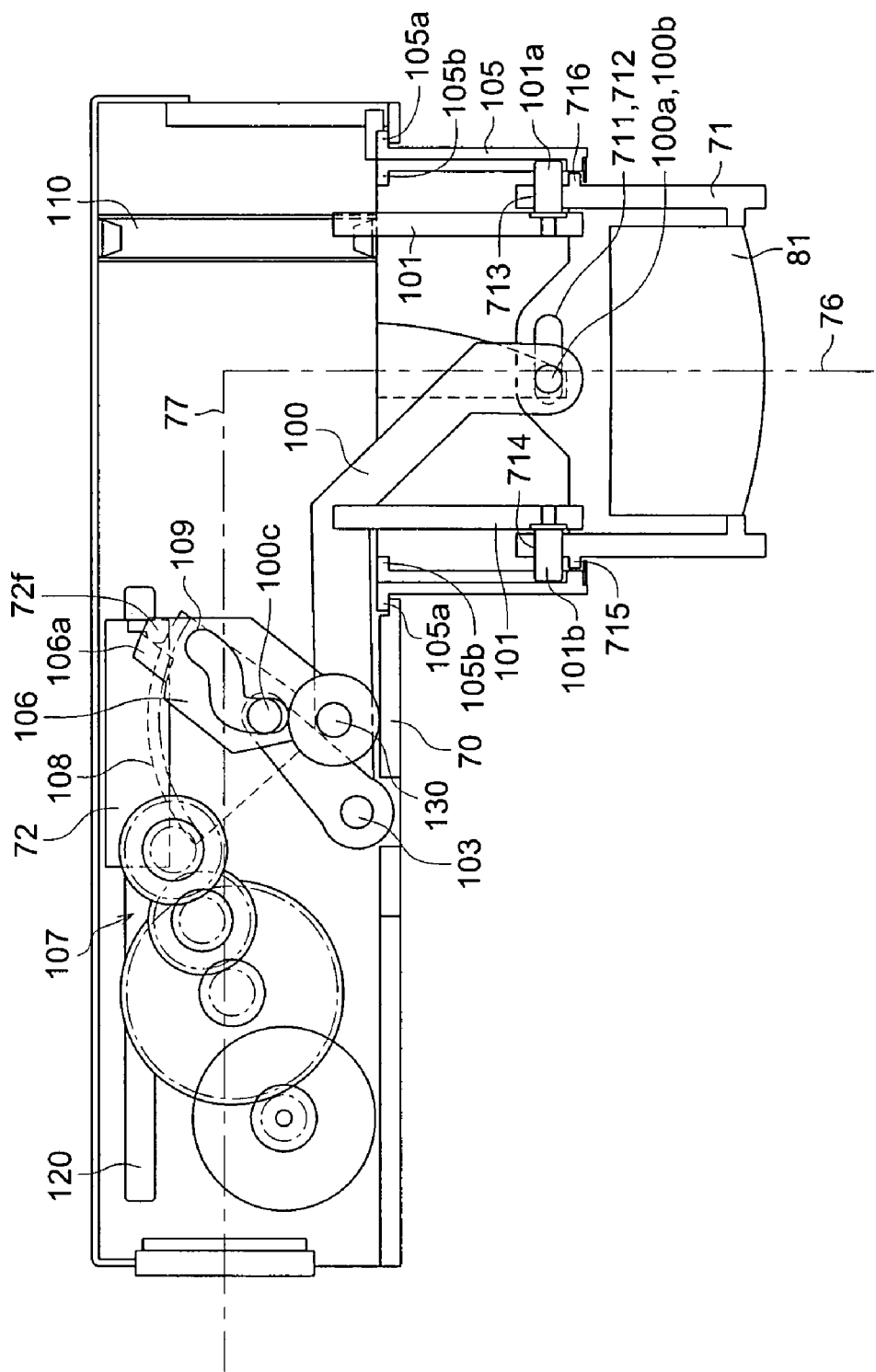
FIG. 5 is a side view of the lens unit of the first embodiment of this invention in the telephoto state.
Figure 6:
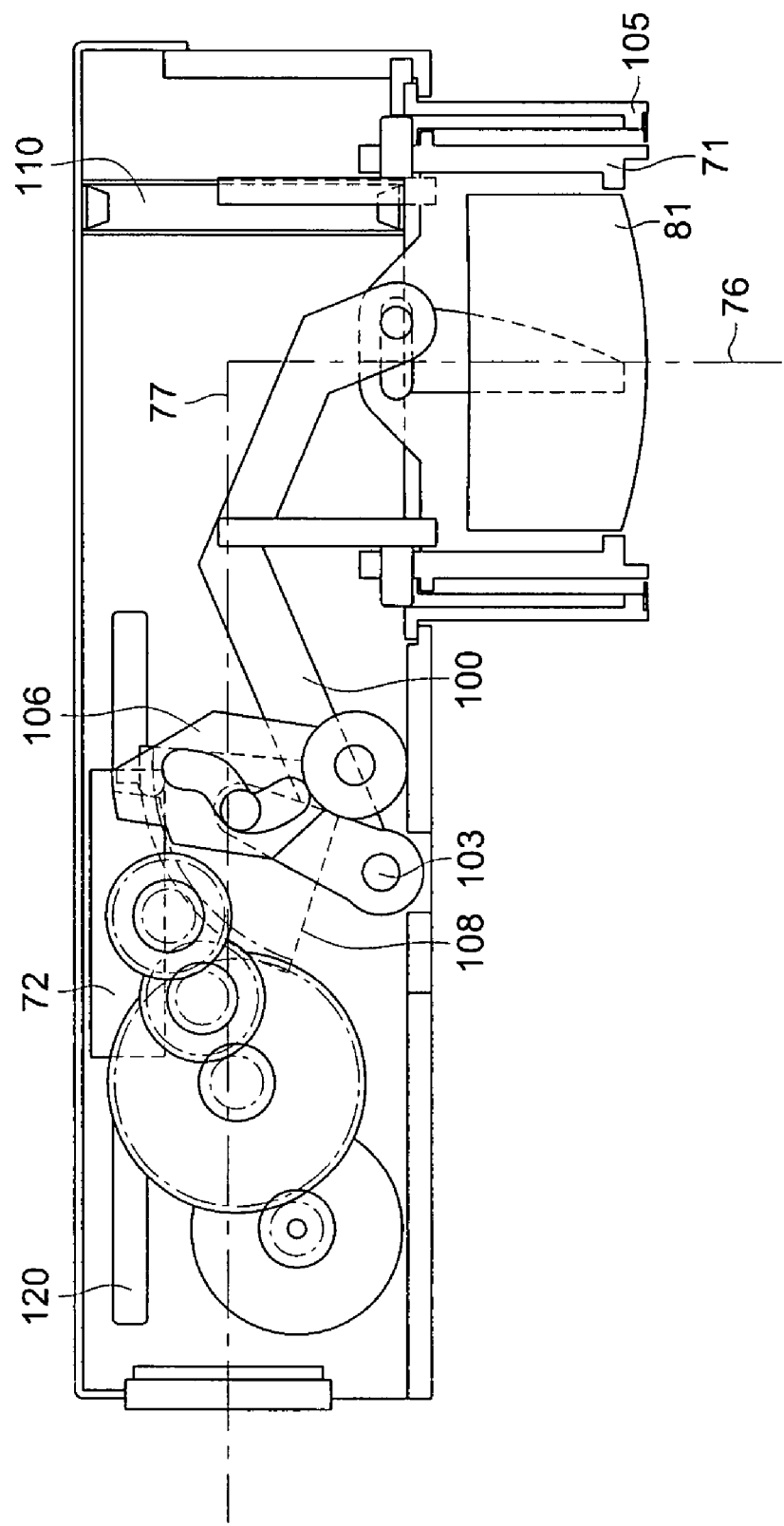
FIG. 6 is a side view of the lens unit of the first embodiment of this invention when collapsed or at the position where the first holding member is moved at startup time (prism inserting and removing position).
Figure 7:
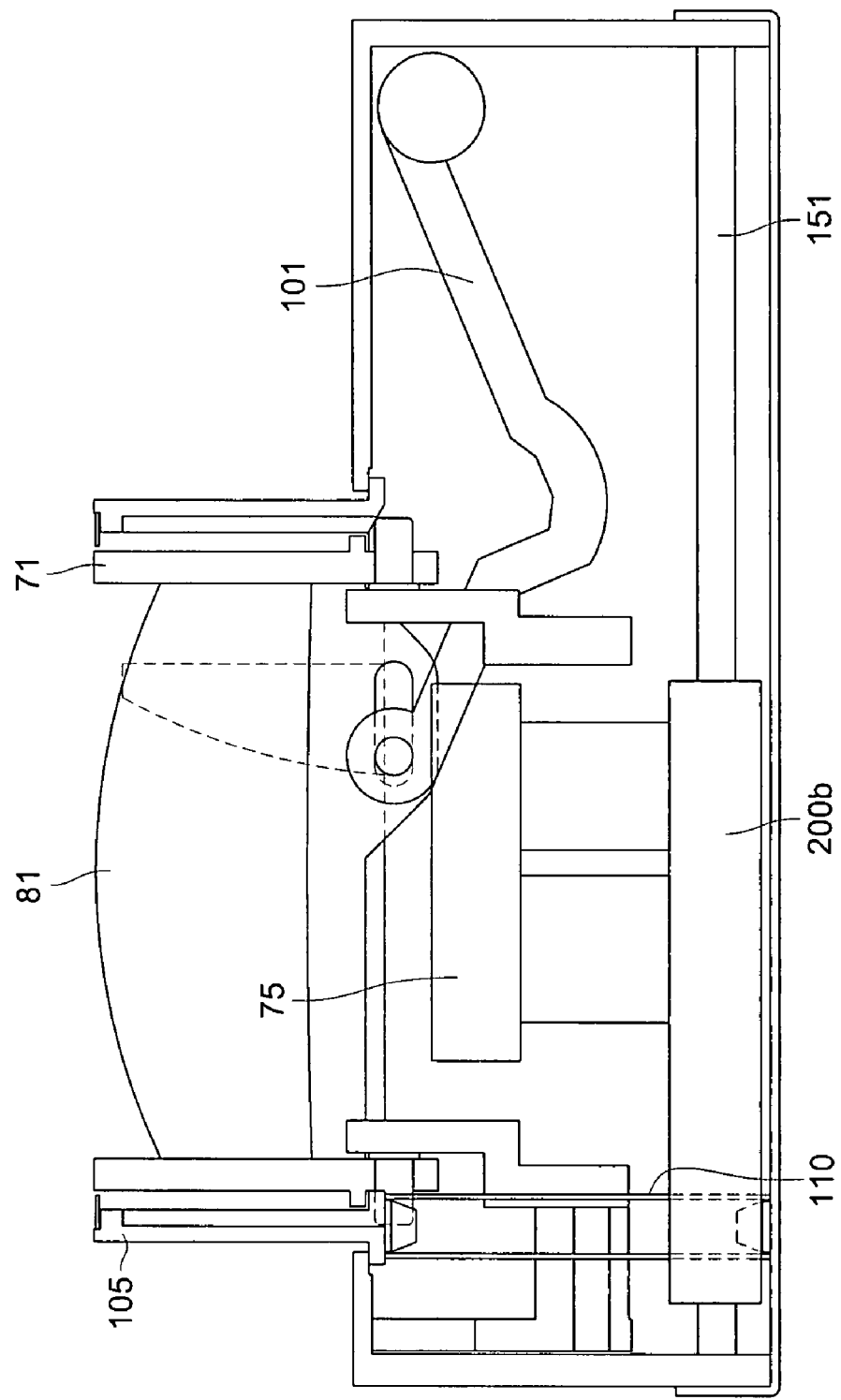
FIG. 7 is a top view of the lens unit of the first embodiment of this invention when collapsed or at the position where the first holding member is moved at startup time (prism inserting and removing position).
Figure 8:
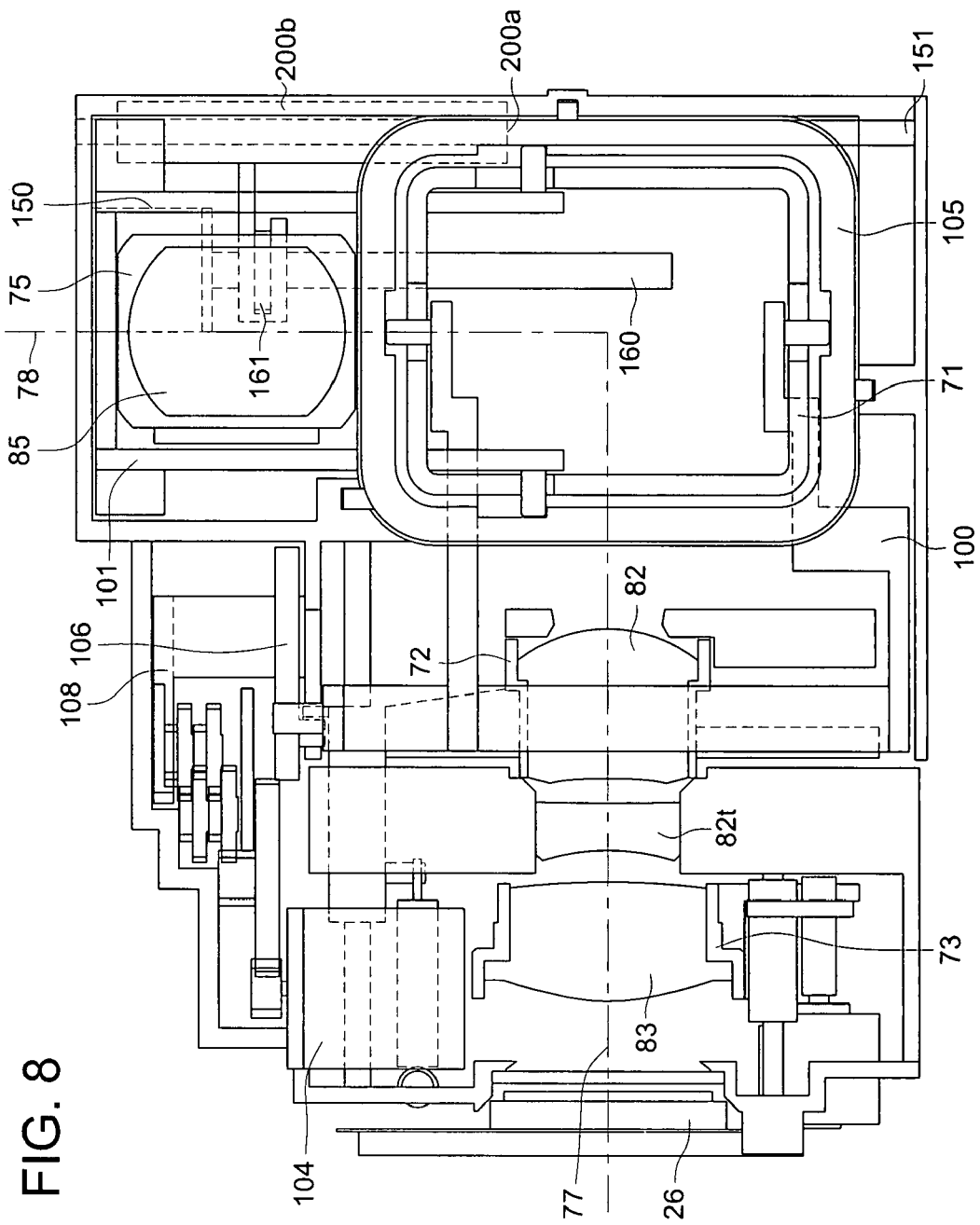
FIG. 8 is a front view of the lens unit of the first embodiment of this invention when collapsed.
Figure 9:
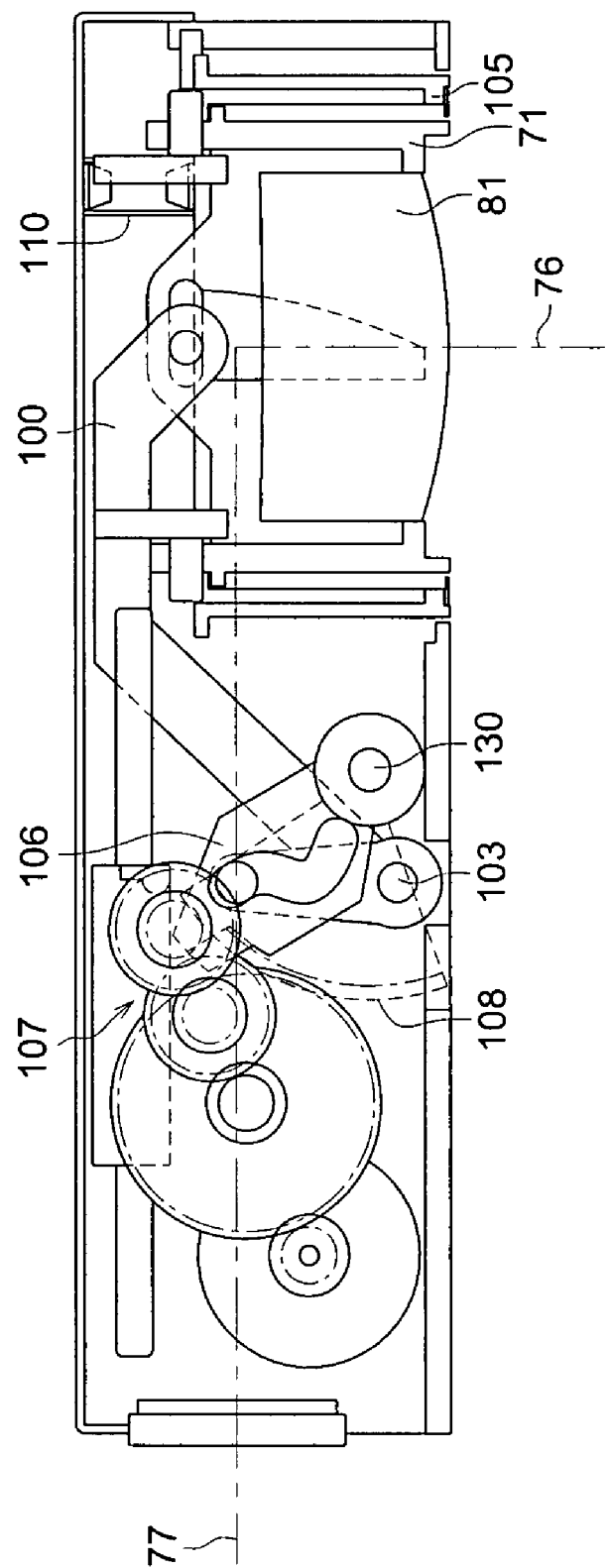
FIG. 9 is a side view of the lens unit of the first embodiment of this invention when collapsed.
Figure 10:
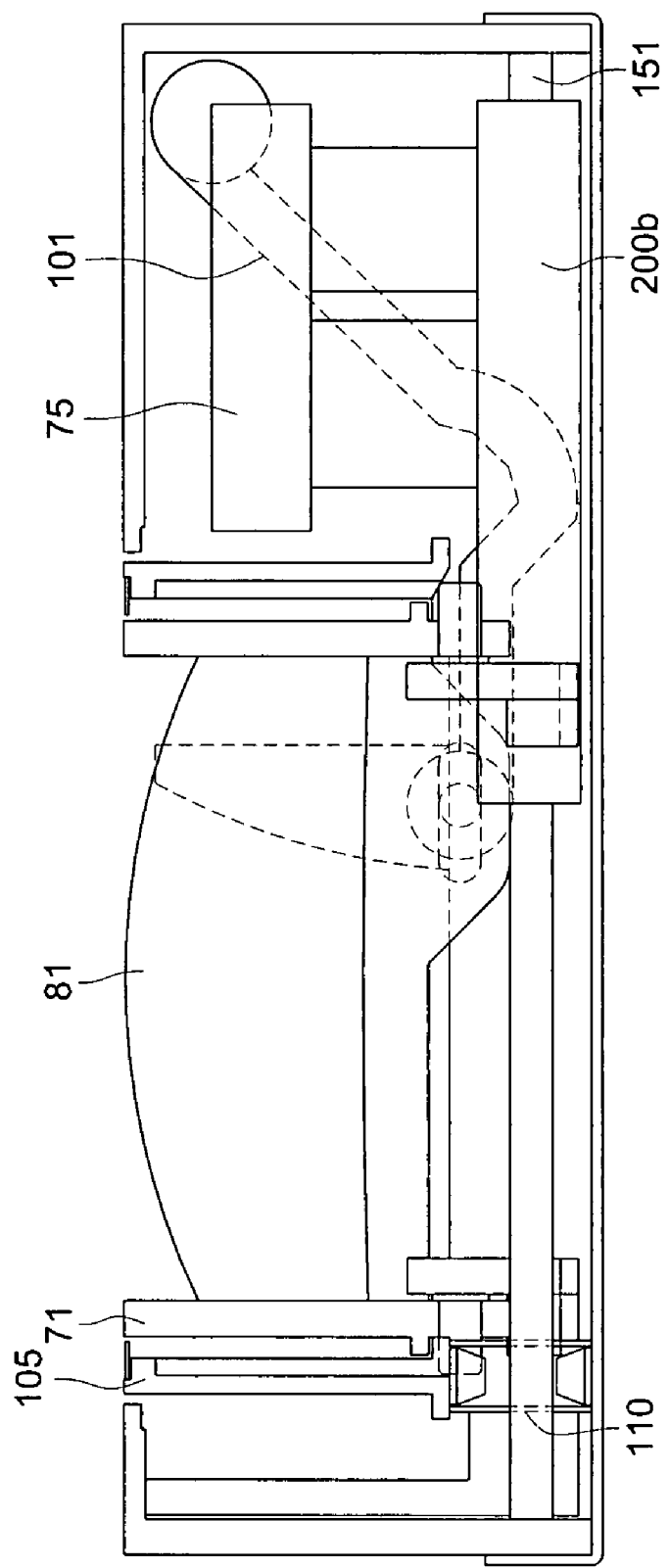
FIG. 10 is a top view of the lens unit of the first embodiment of this invention when collapsed.

FIG. 3 is front view of the lens unit 12 in the wide-angle state; FIG. 4 is a side view of the lens unit 12 in the wide-angle state; FIG. 5 is a side view of the lens unit 12 in the telephoto state; FIG. 6 and FIG. 7 show a side view and top view of the first holding member when collapsed or at the position where the first holding member is moved at startup time (prism inserting and removing position); FIG. 8, FIG. 9 and FIG. 10 respectively show a front view, a side view and a top view of the collapsed state. The side view is used for describing the first moving member for zooming and the first lens group and does not show the bending member, and the second and third lens groups.

First, the structure of the lens unit 12 will be described using FIG. 3 to FIG. 5.

Starting from the object side, the photographing lens comprises a first lens group 81 as the first lens group, a mirror 85 as the bending member, a second lens group 82 as the second lens group which is positioned at the image side of the first lens group and a third lens group 83 which includes image stabilizer lens group 83*t*. The first lens group 81 is on the first optical axis 76, and the second lens group 82 and the third lens group 83 are successive lens and are on the second optical axis 77. The photographing lens forms an image of a light from the object on the image pickup element 26.

The mirror 85 is between the first lens group and the second lens group, and is disposed such that its reflection surface forms at a 45° angle and is a triangular prism whose cross-section is that of a right-angled isosceles triangle, and the mirror 85 is disposed such that its slope forms a 45° angle with respect to the first optical axis 76 and the second optical axis 77, and the first optical axis 76 is bent substantially at right angles to the direction of the second optical axis 77.

During zooming, the first lens group 81, the second lens group 82, and the third lens group 83 move, and during focusing, the third lens group 83 moves. The image stabilizer lens 83*t* is a fixed lens group.

The structure of movement for zooming will be described next. When zooming is done from the wide-angle end to the telephoto end, the first lens group 81 is moved to the object side and the second lens group 82 is moved to the mirror 85 side and the third lens group 83 is moved to the image pickup element 26 side.

The structure of moving for zooming of the first holding member 71 which holds the first lens group 81 is provided with a first holding member 71 for holding the first lens group 81; a drive arm 100 which includes guide pins 100*a* and 100*b* which engages with the guide grooves 711 and 712 of the first holding member 71; a driven arm 101 for restraining the posture of the drive arm 100 and the first holding member 71, and the driven arm 101 comprises driven pins 101*a* and 101*b* which promise the guide grooves 713 and 714 of the first holding member 71. The outside of the first holding member 71 has a straight advance mount 105 which is urged to the object side by the spring 110.

Figure 11:
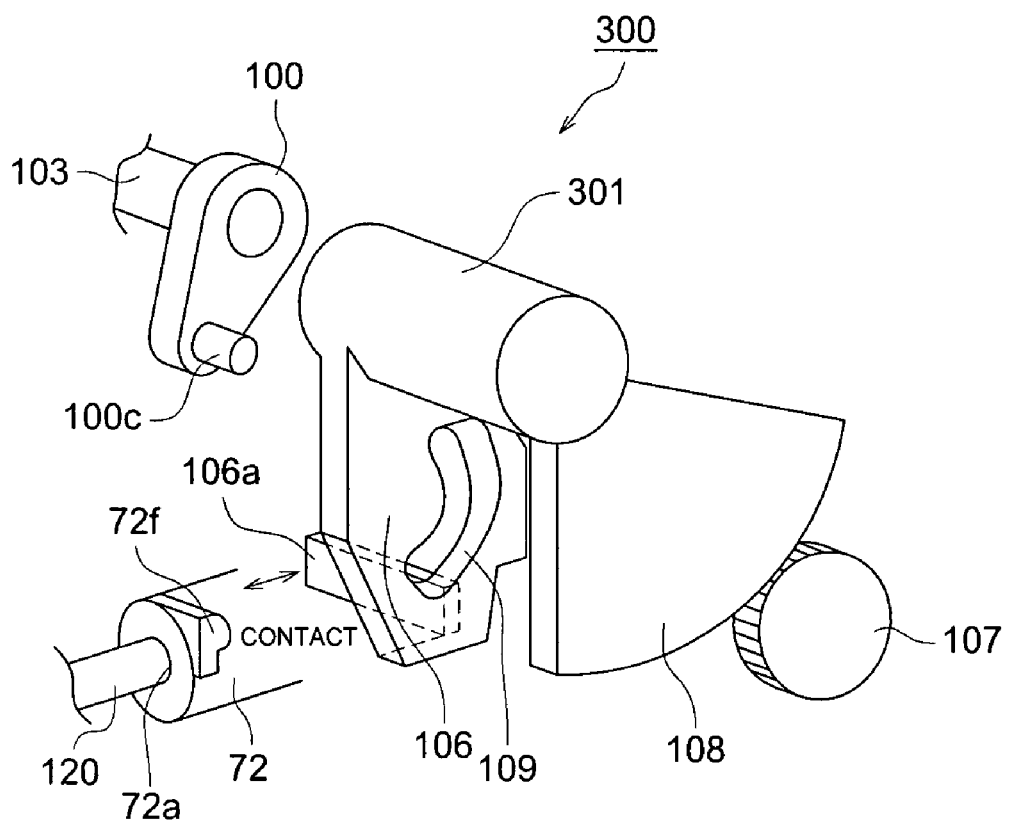
FIG. 11 is a schematic perspective view in the periphery of the coupling member of the first embodiment of this invention.

The holding member 71 is structured of a square-shaped tubular frame and by having such a configuration that the U-shaped arms of the drive arm 100 and the driven arm 101 slides on the inner surface of the first holding member 71, the first holding member thereby moves along the optical axis 76 and restrains the posture such that there is no rotational operation in the vicinity of the optical axis 76. In the first holding member 71, the drive arm 100 is rotated about the drive arm shaft 103 to thereby transmit the rotational force to the holding member 71 using the guide pins 100*a* and 100*b*, and the rotational force is converted to a force which moves linearly and parallel to the optical axis 76. The rotational force of the drive arm 100 is transmitted to the drive arm 100 by the first motor 104 which is the actuator, the gear train 107 and the coupling plate 106 which forms the cam mechanism, and the rotational force that is transmitted to the drive arm 100 is converted to moving force in the direction of optical axis 76 of the first holding member 71 and straight advance movement occurs and the first holding member 71 moves linearly. The area around the coupling member 300 is shown as a schematic perspective view in FIG. 11. The coupling plate 106 forms a portion of the coupling member 300 and rotates about the support shaft 301.

The contact portion 105*b* of the straight advance mount 105 is urged by a spring force to the bottom portion 716 of the first holding member 71 using the straight advance mount compression spring 110 and thus the straight advance mount 105 moves to the object side along with the movement of the first holding member 71 and stops where the bottom portion 105*a* of the straight advance mount 105 contacts the main frame 70. After the bottom portion 105*a* of the straight advance mount 105 contacts the main frame 70 and stops, the first holding member 71 moves to the object side and arrives at the telephoto end. As described above, the drive arm 100 comprises a first moving member for zooming (also called first drive mechanism), which moves the first holding member 71.

When the first motor 104 which is the actuator rotates, the rotational drive force which decelerates at the decelerating gear train 107 rotates the folding-fan shaped gear member 108 of the coupling member 300.

The rotational force from the last gear of the gear train 107 which transmits rotational force from the first motor 104 is transmitted to the folding-fan shaped gear member 108, and the rotational force from the folding-fan shaped gear member 108 is transmitted to the drive arm 100 by the guide pin 100*c* that engages with the coupling plate groove 109, and when the drive arm 100 rotates about the drive arm shaft 103, the first holding member 71 is moved so as to advance straight in the direction of the optical axis 76 via the guide grooves 711 and 712 of the first holding member 71 which are engaged with the guide pins 100*a* and 100*b* and the first holding member 71 is fed to the object side and reaches the telephoto end. When the first holding member 71 moves straight, the movement force is transmitted to driven pins 101*a* and 101*b* of the driven arm 101 which engages with the guide grooves 713 and 714, and the driven arm 101 moves in conjunction with the movement of the first holding member. At this time, the inside surface of the first holding member 71 and the outside surface of driven arm 101 slide to thereby restrict the movement which the first holding member 71 attempts to rotate.

The structure of movement for zooming of the second holding member 72 will be described. The first guide shaft 120 is arranged parallel to the second optical axis 77 and both ends thereof are fixed to the wall surfaces 70*d* and 70*e* of the main body 70. In addition, the first guide shaft 120 fits into the slide guide hole 72*a* of the second holding member 72 which is the guide member and the second holding member 72 is guided so that it can move towards the second optical axis 77 without inclining with respect to the second optical axis 77. At this time, rotation around the first guide shaft 120 is restricted by the straight advance guide groove which is not shown.

Furthermore, the second holding member 72 is urged by a spring force to the image pickup element 26 side in the second optical axis 77 direction by the second spring 72*b* and the guide pin 72*f* of the second holding member 72 contacts the displacement contact portion 106*a* of the coupling plate 106. When the displacement contact portion 106*a* is always in contact with the guide pin 72*f* due to the rotation of the coupling plate 106, the second holding member 72 moves for zooming. In this manner the coupling plate 106 is the second moving member for zooming (also called the second drive mechanism) and at the same time, moves the first displacement moving member and the second displacement moving member so that they are operated in conjunction with each other.

The structure of moving for zooming of the third holding member 73 will be described next. The third guide shaft 61 is arranged parallel to the second optical axis 77 and one end thereof is fixed to the wall surface 70*d* of the main body 70 and the other end is fixed to the middle wall surface 70*f*. The third guide shaft 61 fits into the slide guide hole 73*a* of third holding member 73 and third holding member 73 is guided so that it can move towards the second optical axis 77 without inclining with respect to the second optical axis 77. The third drive shaft 62 which is coupled with the rotational shaft of the third motor 63 is arranged parallel to the second optical axis 77 and a helicoid screw is formed at the outer surface thereof and it screws into the engagement screw 73b of the third holding member 73 and rotation of the area around the third guide shaft 61 is restricted by the straight advance guide groove which is not shown.

When the third motor 63 rotates, the third holding member 73 moves to the image pickup element 26 side by the lead of the third drive shaft 62 and arrives at the telephoto end.

Next, the operation will be described.

First, the operation from the wide-angle end in FIG. 4 to the telephoto end in FIG. 5 will be described.

When the decelerating gear train 107 in FIG. 4 is driven by the driving of the first motor, the folding-fan shaped gear member 108 which is a portion of the coupling member 300 rotates around the coupling plate shaft 130. The coupling plate groove 109 of the coupling plate 106 rotates around the coupling plate shaft 130 along with the rotation of the folding-fan shaped gear member 108 and the guide pin 100c which engages with the coupling plate groove 109 moves along the coupling plate groove 109 and the drive arm 100 rotates about the drive arm shaft 103. The guide pins 100a and 100b transmit drive force to the guide groove 711 and 712 of the first holding member 71 that engages with the guide pins 100a and 100b due to the rotation of the drive arm 100 and the first holding member 71 moves to the object side along the optical axis 76. In addition, the displacement contact portion 106a presses the guide pin 72f of the second holding member 72 when the coupling plate 106 rotates and the second holding member 72 moves along the first guide shaft 120. The straight advance mount 105 moves to the object side in conjunction with the movement of the first holding member 71 when the contact portion 105b is in contact with the bottom portion 716 of the first holding member 71, and it stops where the bottom portion 105a of the straight advance mount 105 contacts the main body 70. After this, only the first holding member 71 moves to the object side. In addition, when the first holding member 71 moves, the guide groove 713 and 714 of the first holding member 71 move and the driven pins 101a and 101b of the driven arm 101 which engages with the guide grooves 713 and 714 move. In this manner, the outside surface of driven arm 101 and the inside surface of the first holding member 71 are slid and thus the first holding member can move smoothly along the optical axis 76. In this manner the first holding member reaches the telephoto end shown in FIG. 5.

Next, the zoom operation of the third holding member 73 will be described. The third guide hole 73a of the third holding member 73 fits with the third guide shaft 61 and the third holding member 73 is guided to the second optical axis 77 direction. When the third motor 63 rotates from the wide angle state, the holding member 73 advances straight to the image pickup element 26 side by the lead of the third drive shaft 62 and arrives at the telephoto end.

The collapse operation will be described next.

As shown in FIG. 6 and FIG. 7, when collapsing is done, the first holding member 71 moves to the prism inserting and removing position, and next, as shown in FIG. 8-FIG. 10, the mirror holding member 75 recedes at the axis 78 which is perpendicular to the optical axes 76 and 77 and then first holding member moves on the first optical axis 76 and stored into the space formed when the mirror 85 moves. At this time, the first holding member 71 and the second holding member 72 move on a interlocking basis.

When the first motor 104 is driven, the drive arm 100 rotates about the drive arm shaft 103 and the first holding member 71 moves to the prism inserting and removing position which is between the wide-angle end (wide end) and the telephoto end (tele end) (shown in FIG. 6 and FIG. 7). Next, the mirror holding member (bending section holding member) 75 which holds the mirror 85 recedes to the receded position. The mechanism for moving the mirror holding member 75 to the receded position will be described using FIG. 8 and FIG. 9. The mirror holding member 75 which holds the mirror 85 has a slide guide portion 200b and a slide guide hole 200a, and the slide guide hole 200a fits with the second guide axis 151 which is fixed to the main body 70. The slide guide portion 200b is moved by the bending section moving member which is formed of the drive shaft 160 which is driven by the second motor 150 and the engagement screw 161. The slide guide portion 200b is coupled to the engagement screw 161, and the drive shaft 160 rotates due to the rotation of the second motor 150 and the engagement screw 161 moves due to this rotation and thus the mirror holding member 75 moves along the second guide shaft 151 and retreats to the receded position shown in FIG. 8 and FIG. 10.

Next, the first motor 104 is driven and due to the rotation of the drive arm 100, the first holding member 71 moves to the collapse position (shown in FIG. 9 and FIG. 10) and thus the movement of the third holding member may be restricted to the image side beyond the wide angle position by the restricting member which is not shown. In this case, the collapse operation ends when the guide pin 72f and the displacement contact portion 106a separate.

At startup time, movement is in the opposite order from the collapse operation. That is to say, the first holding member 71 moves to the prism inserting and removing position. At this time, the drive arm 100 which moves the first holding member 71 becomes the first moving member. Next, the mirror holding member 75 moves to the bending position and is then moved to a prescribed position in a zoom region (wide-angle end to telephoto end) and photographing is done.

Second Embodiment

The structure of the lens unit 30 is described as the second embodiment.

Figure 12:
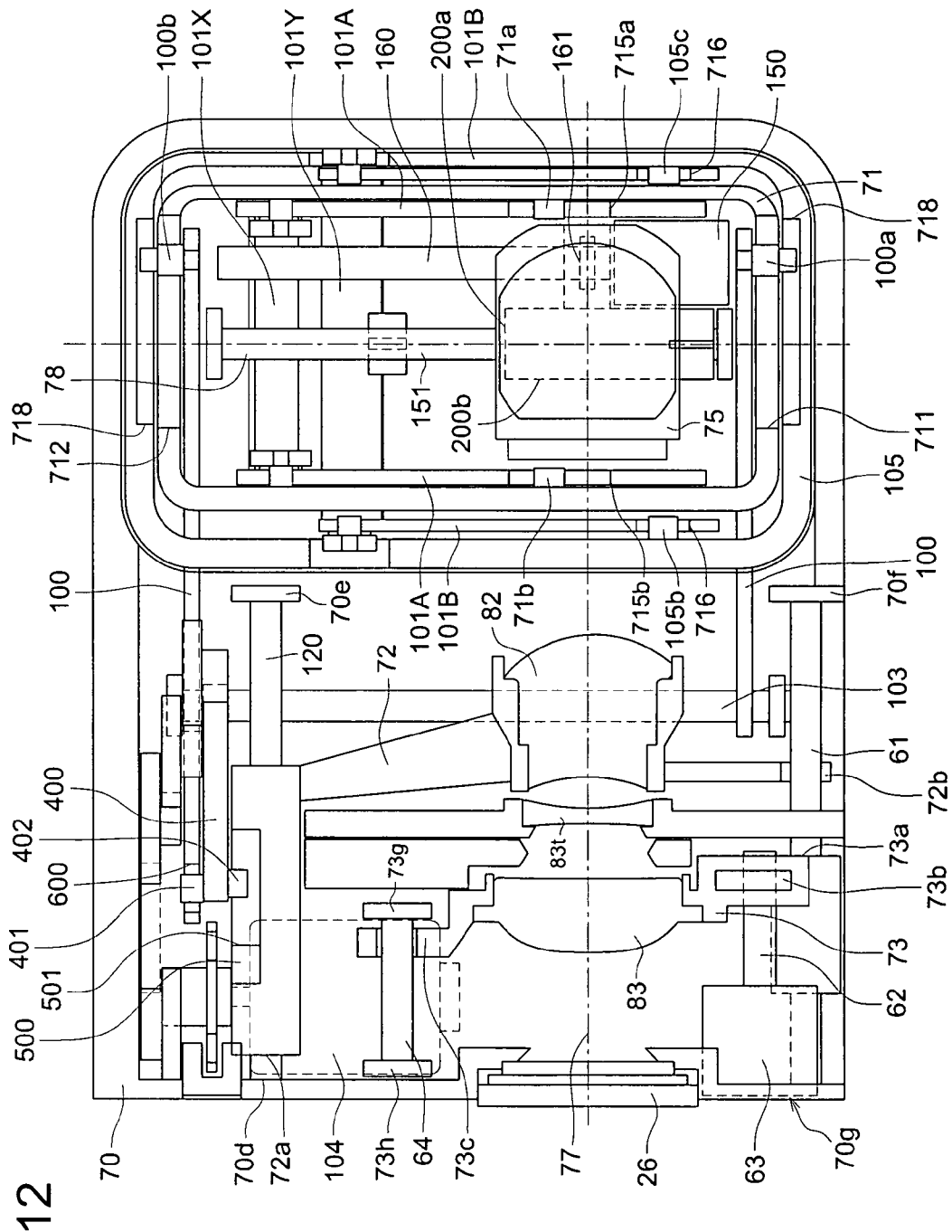
FIG. 12 is front view of the lens unit of the second embodiment of this invention.
Figure 13:
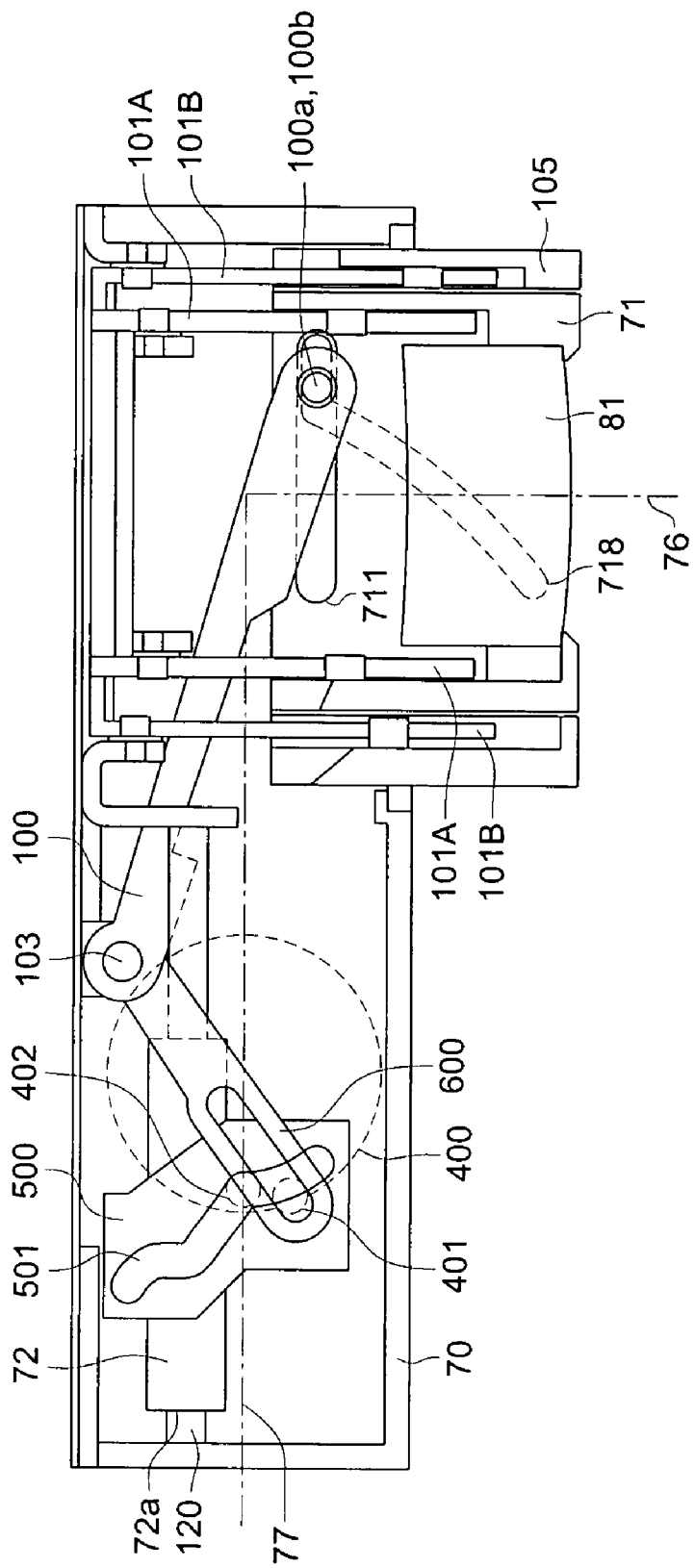
FIG. 13 is a side view of the lens unit of the second embodiment of this invention in the wide-angle state.
Figure 14:
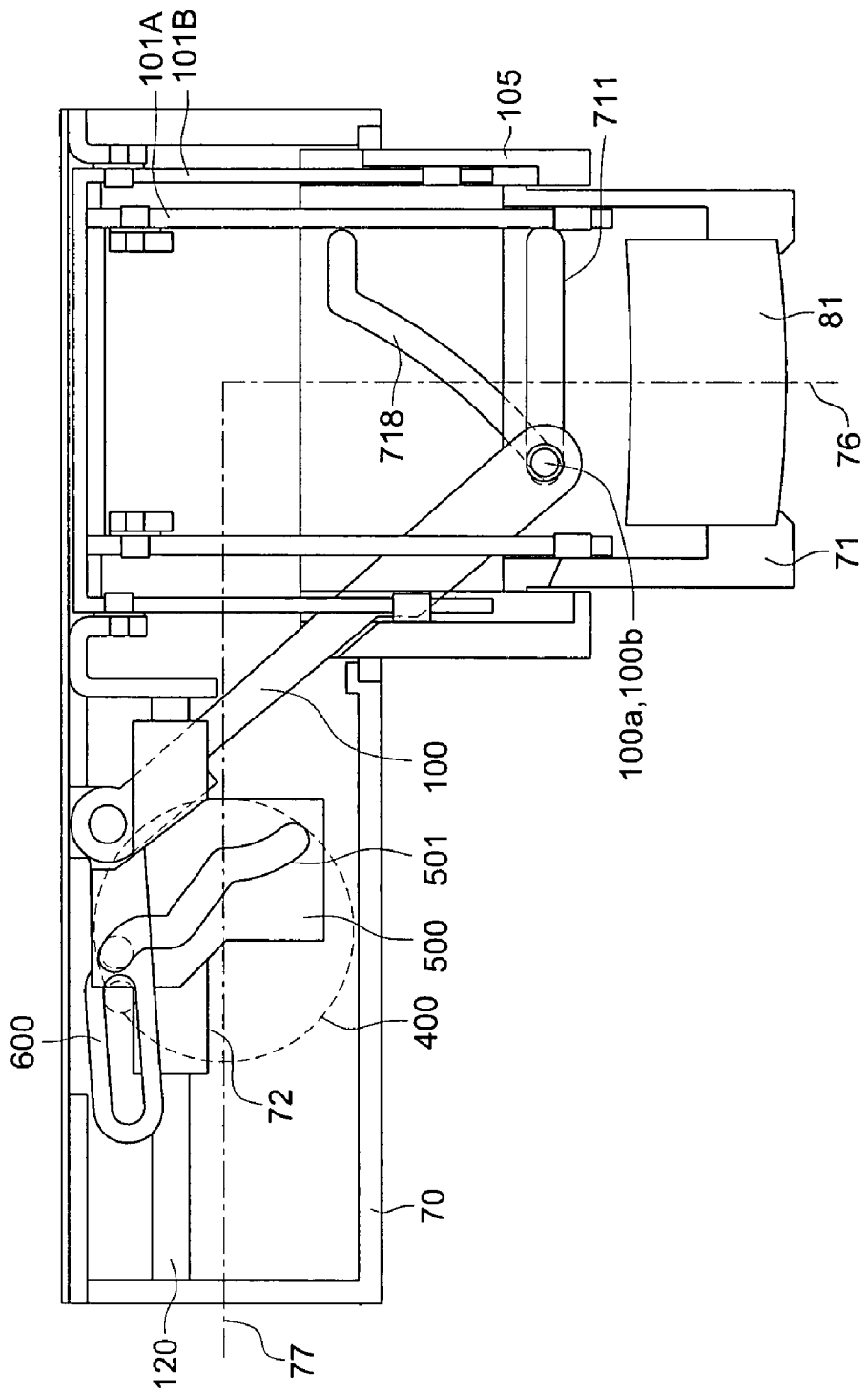
FIG. 14 is a side view of the lens unit of the second embodiment of this invention in the telephoto state.
Figure 15:
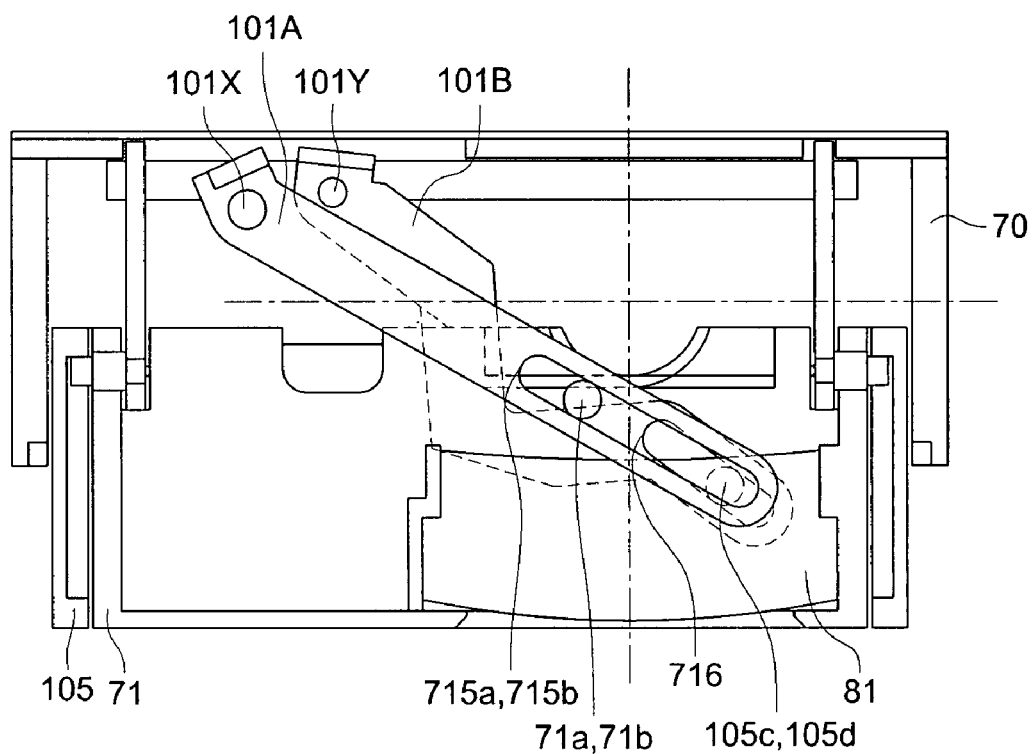
FIG. 15 is a top view of the lens unit of the second embodiment of this invention in the wide-angle state.
Figure 16:
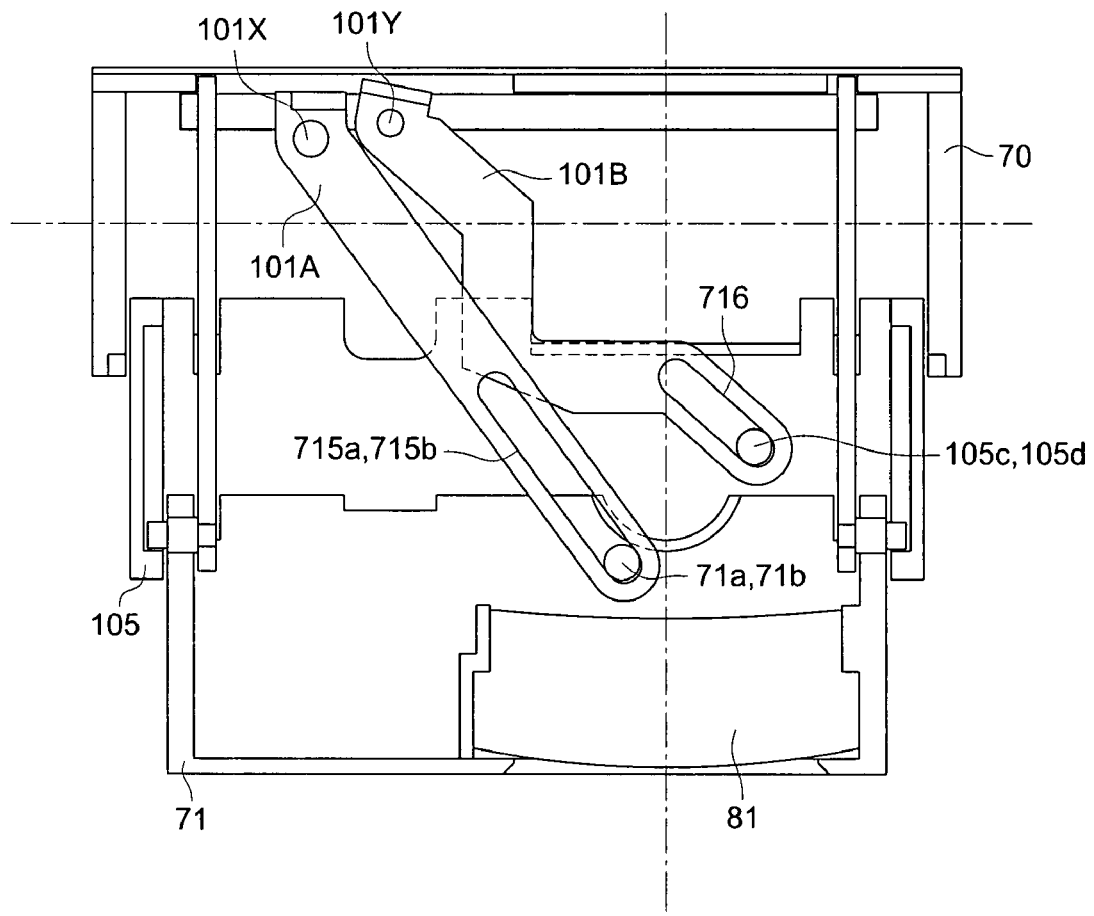
FIG. 16 is a top view of the lens unit of the second embodiment of this invention in the telephoto state.
Figure 17:
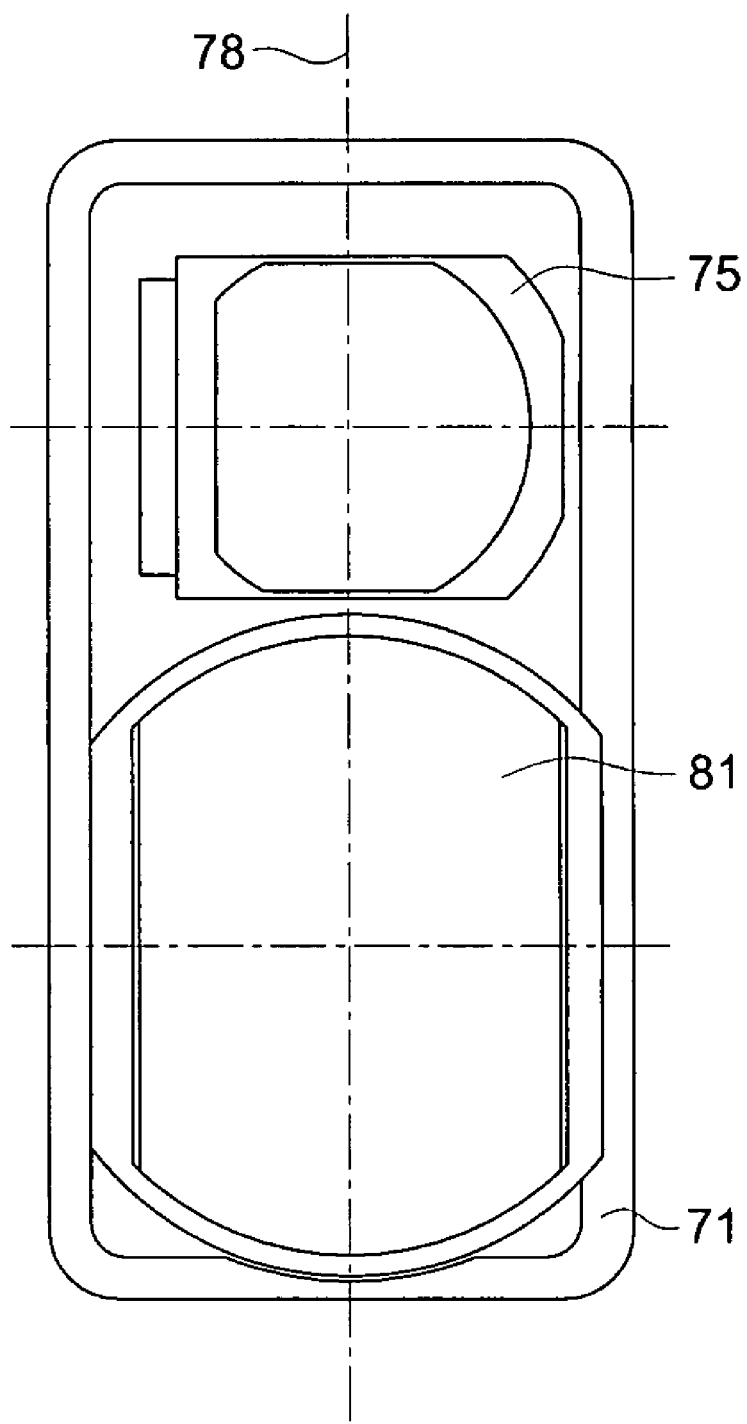
FIG. 17 is a portion of the front view of the lens unit of the second embodiment of this invention in the collapsed state.
Figure 18:
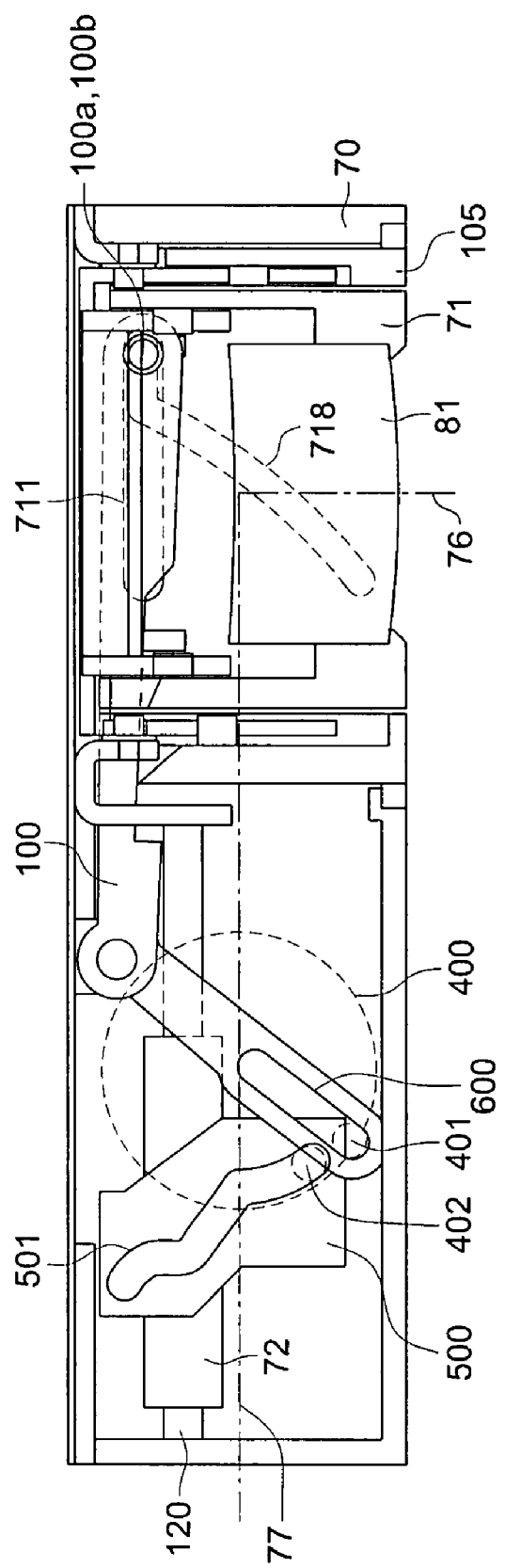
FIG. 18 is a side view of the lens unit of the second embodiment of this invention in the collapsed state.
Figure 19:
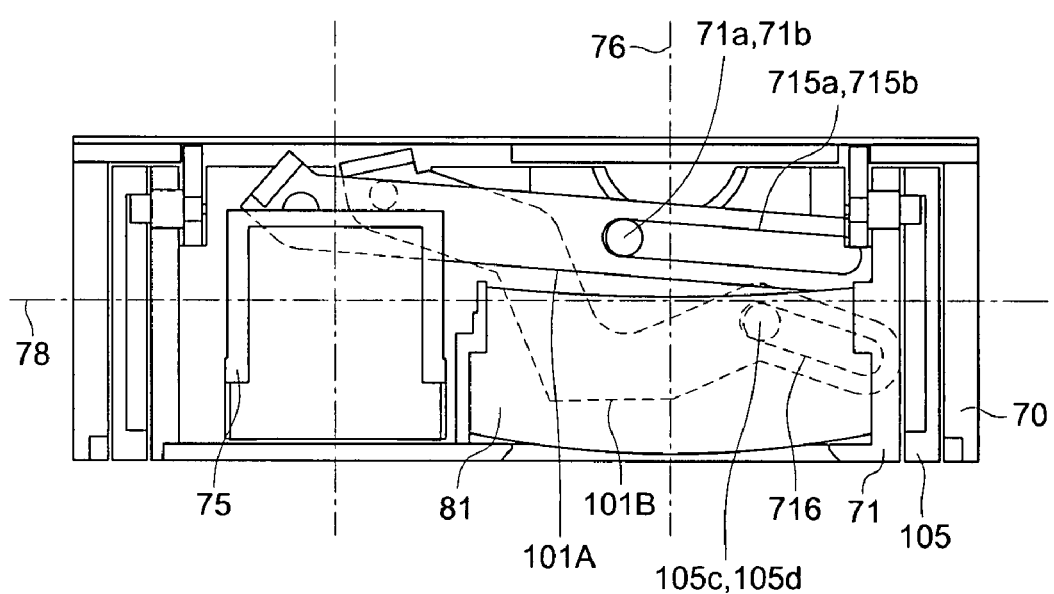
FIG. 19 is a top view of the lens unit of the second embodiment of this invention in the collapsed state.

FIG. 12 is front view of the lens unit 30 in the wide angle state; FIG. 13 is a side view of the lens unit 30 in the wide angle state; FIG. 14 is a side view of the lens unit 30 in the telephoto state; FIG. 15 is a top view of the lens unit 30 in the wide angle state; FIG. 16 is a top view of the lens unit 30 in the telephoto state; FIG. 17 is a main portion showing the front in the collapsed state and the retreat state of the mirror holding member; FIGS. 18 and 19 respectively show side view and the top view in the collapsed state. The side view is used for describing the movement of the first zooming and moving member and the first lens group without showing the bending member, and the second and third lens groups. It is to be noted that the members which have the same functions as the first embodiment have been assigned the same reference numbers and descriptions thereof are not repeated.

The differences between the second embodiment and the first embodiment are: the second embodiment does not have the direct advance compression spring 110 which urges the straight advance mount 105 and it is moved by using the drive force from the drive arm 100; there are two sets of driven arms which are the first driven arm 101A and the second driven arm 101B which respectively restrict rotation at the time of movement of the first holding member 71 and the straight advance mount 105; and the coupling plate 400 which is the coupling member are shaped as discs which have gear grooves and have drive shafts (guide pins) 401 and 402 on both surfaces and the rotating force of the first motor rotates the coupling member 400 via the decelerating gear train 107 and the first lens group 81 and the second lens group 82 are driven on a interlocking basis by the respective drive shafts (guide pins) 401 and 402.

The structure of the lens unit 30 shown in FIG. 12 is the same as that of the first embodiment and thus a description thereof has been omitted.

The structure of movement for zooming of the first lens group 81 and the second lens group 82 will be described in the following using FIG. 12 to FIG. 16.

The structure for moving for zooming of the first lens group 81 is provided with a first holding member 71 for holding the first lens group 81; a drive arm 100 which includes guide pins 100a and 100b which fit with the guide grooves 711 and 712 of the first holding member 71; a first driven arm 101A for restraining the posture of the drive arm 100 and the first holding member 71, and the driven arm 101A comprises driven grooves 715a and 715b which fit with the guide pins 71a and 71b of the first holding member 71. The outside of the first holding member 71 has a straight advance mount 105.

Figure 20:
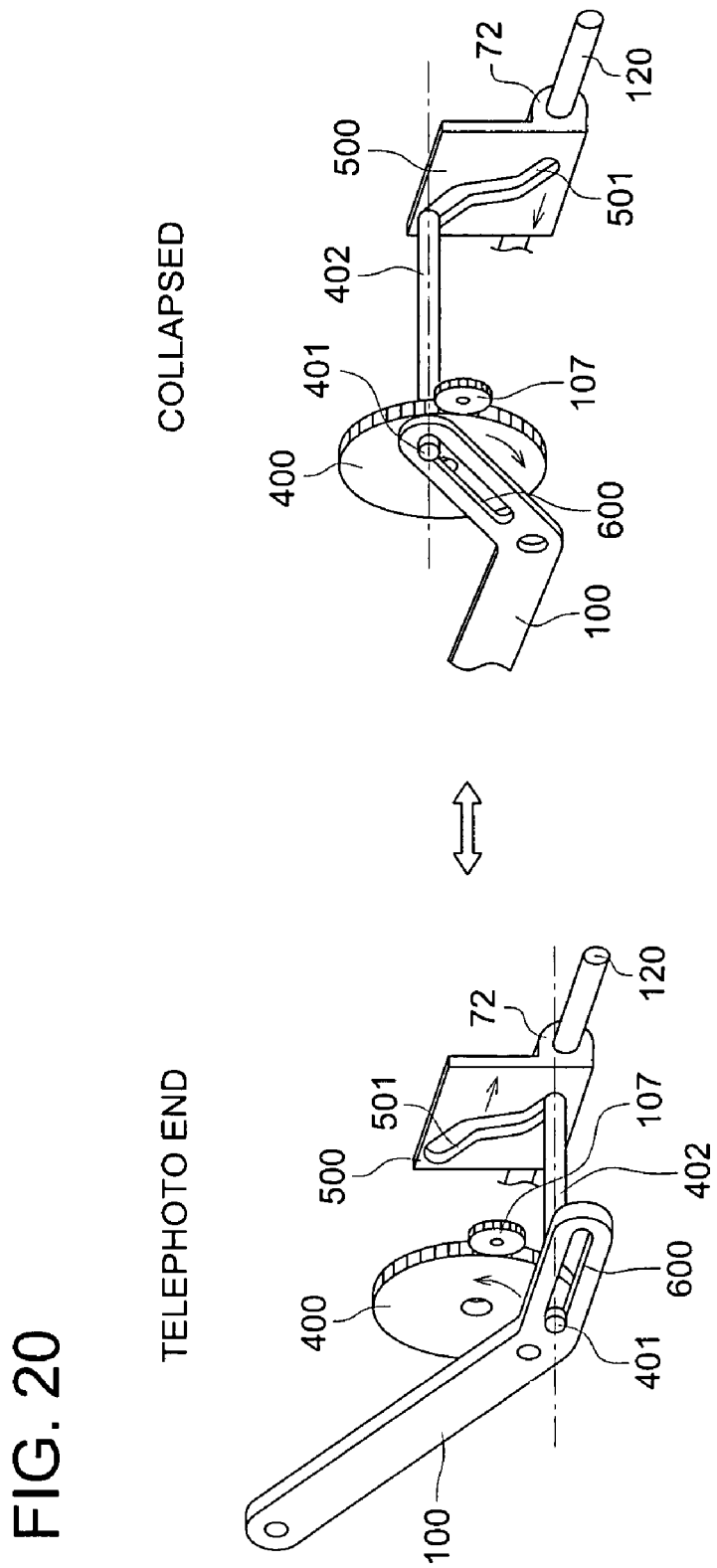
FIG. 20 is a schematic perspective view of the coupling member vicinity of the lens unit of the second embodiment of this invention in the telephoto state and the collapsed state.

The holding member 71 is formed of a square-shaped tubular frame and by having such a configuration that the U-shaped arms of the drive arm 100 and the first driven arm 101 slides on the inner surface of the first holding member 71, the first holding member 71 thereby moves along the optical axis direction 76 and restrains the posture such that there is no rotational operation. In the first holding member 71, the drive arm 100 rotates about the drive arm shaft 103 to thereby transmit the rotational force to guide grooves 711 and 712 from the guide pins 100a and 100b, and the rotational force is converted to a force which moves the first holding member 71 linearly and parallel to the optical axis 76. The rotational force of the drive arm 100 is transmitted to the drive arm 100 by the first motor 104 which is the actuator, the gear train 107 and the coupling plate 400 which is the coupling member and which forms the cam mechanism. The area around the coupling member 400 is shown as a schematic perspective view in FIG. 20. The peripheral surface of the coupling plate 400 forms a gear which meshes with last gear of the gear train 107, and the outside surface of the coupling plate 400 has a guide pin 401 which fits with the guide groove 600 of the first holding member 71. When the coupling plate 400 rotates, the rotational force is transmitted to the drive arm 100 from the guide groove 600 and it rotates about the drive arm shaft 103. The rotational force that is transmitted to the drive arm 100 is converted to moving force in the direction of optical axis 76 of the first holding member 71 and straight advance movement occurs.

The straight advance mount 105 is constituted of a square-shaped tubular frame that is at the outside of the first holding member 71 and by having such a configuration that the U-shaped arm of the second drive arm 100B slides on the inner surface of the straight advance mount 105, the straight advance mount 105 thereby moves along the optical axis 76 and restrains the posture such that there is no rotational operation. In the straight advance mount 105, the drive arm 100 rotates about the drive arm shaft 103 to thereby transmit the rotational force to guide groove 718 from the guide pins 100a and 100b, and the rotational force is converted to a force which moves the straight advance mount 105 linearly and parallel to the optical axis 76. The straight advance mount 105 advances straight along the optical axis 76 with the holding member 71 at the portion where the shape of the guide groove 718 is linear, and it does not move at the arc-shaped portion and only the first holding member 71 moves.

When the first motor 104 which is the actuator rotates, the rotation drive force that was reduced by the deceleration gear train 107 rotates the gear portion at the peripheral surface of the coupling plate 400.

The rotational force from the last gear of the gear train 107 which transmits rotational force from the first motor 104 is transmitted to the gear section on the periphery of the coupling plate 400, and the rotational force from the gear portion is transmitted to the guide groove 600 of the drive arm 100 that engages with the guide pin 401, via the guide pin 401 that is formed on the outside surface of the coupling plate 400 and the drive arm 100 rotates about the drive arm shaft 103. When the drive arm 100 rotates, the first holding member 71 moves so as to advance straight in the direction of the optical axis 76 via the guide grooves 711 and 712 of the first holding member 71 which are engaged with the guide pins 100a and 100b and the first holding member 71 is fed to the object side and reaches the telephoto end. When the first holding member 71 moves straight, the driven arm 101A moves in conjunction with the movement of the first holding member 71 via the driven grooves 715a and 715b which engage with the guide pins 71a and 71b. At this time, the inside surface of the first holding member 71 and the outside surface of the first driven arm 101 slide to thereby restrict the movement which the first holding member 71 attempts to rotate.

The structure of movement for zooming of the second holding member 72 will be described. The first guide shaft 120 is arranged parallel to the second optical axis 77 and both ends thereof are fixed to the wall surfaces 70d and 70e of the main body 70. In addition, the first guide shaft 120 fits into the slide guide hole 72a of the second holding member 72 which is the guide member and the second holding member 72 is guided so that it can move towards the second optical axis 77 without inclining with respect to the second optical axis 77. At this time, rotation around the first guide shaft 120 is restricted by the shaft 61 and the slide portion 72b.

Furthermore, the second holding member 72 is provided with a cam plate 500 and the cam plate 500 includes a guide groove 501 that fits with a guide pin 402 that is formed on the inside surface of the coupling plate 400. When the coupling plate 400 rotates, the second holding member 72 is moved via the guide pin 402 and the guide groove 501.

In this manner, the first moving member 71 and the second moving member 72 are moved so that they operate in conjunction with each other due to the coupled portion of the guide pin 401 that is formed on one surface of the coupling plate 400 and the guide groove 600 of the first holding member 71 and the coupled portion of the guide pin 402 formed on the other surface and the guide groove 501 of the second holding member 72.

The structure of movement for zooming of the third holding member 73 will be described next. The third guide shaft 61 is arranged parallel to the second optical axis 77 and one end thereof is fixed to the wall surface 70g of the main body 70 and the other end is fixed to the middle wall surface 70f. The third guide shaft 61 fits into the slide guide hole 73a of third holding member 73 and third holding member 73 is guided so that it can move towards the second optical axis 77 without inclining with respect to the second optical axis 77. The third drive shaft 62 which is coupled with the rotational shaft of the third motor 63 is arranged parallel to the second optical axis 77, and a helicoid screw is formed at the outer surface thereof and it screws into the engagement screw 73b of the third holding member 73. The shaft 64 is fixed to the 73g and 73h and is guided along with 73c in the direction of optical axis 77.

When the third motor 63 rotates, the third holding member 73 moves to the image pickup element 26 side by the lead of the third drive shaft 62 and arrives at the telephoto end.

Next, the operation will be described.

First, the operation from the wide-angle end in FIG. 12, FIG. 13 and FIG. 15 to the telephoto end in FIG. 14 and FIG. 15 will be described.

When the decelerating gear train 107 in FIG. 12 is driven by the driving of the first motor 104, the gear section of the coupling plate 400 rotates. When the guide pin 401 at the outside surface of the coupling plate 400 rotates along with the rotation of the gear section, the drive arm 100 which has a guide groove 600 which fits with the guide pin 401 rotates about the drive arm shaft 103. The guide pins 100a and 100b transmit drive force to the guide grooves 711 and 712 of the first holding member 71 which engage with the guide pins 100a and 100b by the rotation of the drive arm 100, and the first holding member 71 moves to the object side along the optical axis 76. In addition, the guide pin 402 on the inside surface of the coupling plate 400 presses the guide groove 501 that is formed on the cam plate 500 of the second holding member 72 along with the rotation of the coupling plate 400, and the second holding member 72 moves along the first guide shaft 120. In addition, the straight advance mount 105 moves in conjunction with the movement of the guide pins 100a and 100b of the drive arm 100 to the object side using the guide groove 718 which fits with the guide pins 100a and 100b, and then stops at the position where the guide pins 100a and 100b are removed from the linear part of the guide groove 18. After this, only the first holding member 71 moves to the object side. The guide pins 71a and 71b of the first holding member 71 move along with the movement of the first holding member 71 and the driven grooves 715a and 715b of the first driven arm 101A which engages with the guide pins 71a and 71b move. In addition, the driven groove 716 of the second driven arm 101B which engages with the guide pins 105c and 105d of the straight advance mount 105 moves with the movement of the straight advance mount 105.

In this manner, the outside surface of driven arm 101A and the inside surface of the first holding member 71 are slid and thus the first holding member can move smoothly along the optical axis 76. Also by sliding the outside surface of the second driven arm 101B and the outside surface of the first holding member 71, the straight advance mount 105 can be moved smoothly along the optical axis 76. In this manner it reaches the telephoto end shown in FIG. 14 and FIG. 16.

Next, the zooming operation of the third holding member 73 will be described. When the third motor 63 rotates from the wide-angle state, the third holding member 73 is guided toward the second optical axis 77 when the third slide guide hole 73a fits together with the third guide shaft 61 by the lead of the third drive shaft 62 and thus advances straight to the image pickup element 26 side and arrives at the telephoto end.

Next, the collapsing operation will be described.

At the time of collapsing, as shown in FIG. 13 and FIG. 15, the first holding member 71 moves to the mirror wide angle position, and next as shown in FIG. 17 to FIG. 19, the mirror holding member 75 retreats at the axis 78 perpendicular to the optical axes 76 and 77 and then the first holding member 71 moves on the optical axis 76 and stored into the space formed when the mirror 85 moves. The first holding member 71 and the second holding member 72 move on a interlocking basis.

When the first motor 104 is driven, the drive arm 100 rotates about the drive arm shaft 103 and the first holding member 71 moves to the prism inserting and removing position which is the wide-angle end (wide end). Next, the mirror holding member (bending section holding member) 75 which holds the mirror 85 recedes to the receded position. The mechanism for moving the mirror holding member 75 to the receded position will be described using FIG. 12 and FIG. 17. The mirror holding member 75 which holds the mirror 85 comprises a slide guide portion 200b and a slide guide hole 200a, and the slide guide hole 200a fits with the second guide axis 151 that is fixed to the main frame 70. The slide guide portion 200b is moved by the bending section moving member which is formed of the drive shaft 160 which is driven by the second motor 150 and the engagement screw 161. The slide guide portion 200b is coupled to the engagement screw 161, and the drive shaft 160 rotates due to the rotation of the second motor 150 and the engagement screw 161 moves due to this rotation and thus the mirror holding member 75 moves along the second guide shaft 151 and retreats to the receded position shown in FIG. 17.

Next, the first motor 104 is driven and due to the rotation of the drive arm 100, the first holding member 71 moves to the collapse position (See FIG. 18 to FIG. 20) and thus the collapse operation ends.

At startup time, movement is in the opposite order from the collapse operation. That is to say, the first holding member 71 moves to the wide-angle position. Next, the mirror holding member 75 moves to the bending position.

As described above, a lens unit having a plurality of lens groups, which includes a first lens group which is arranged in the first optical axis direction, on which a light flux from an object is incident and a second lens group that is positioned closer to an image side than the first lens group and is arranged in the second optical axis direction; a bending section which is positioned between the first lens group and the second lens group and bends the first optical axis in the second optical axis direction, wherein the first lens group and the second lens group are movable in the respective optical axis directions at the time of zooming; an actuator which drives the first lens group and the second lens group; a first drive mechanism which moves the first lens group; a second drive mechanism which moves the second lens group; and a coupling member which simultaneously transmits drive force from the actuator to the first drive mechanism and the second drive mechanism and by moving the two lens group with one actuator, movement precision is improved and cost is decreased.

In addition, by moving the first lens group without rotating it and configuring the first drive mechanism to have an arm-shaped drive member, the structure for driving is simplified and made more compact.

Also, because the first drive mechanism and the second drive mechanism are joined by cam, the movement of the lens group becomes smooth.

Furthermore, because the coupling member has a support shaft and a coupling plate that rotates around the support shaft and due to rotation of the coupling plate around the support shaft, drive force is applied to the first drive mechanism and the second drive mechanism and thus they can move on a interlocking basis more smoothly and movement precision can be improved.

In addition, by arranging the support shaft between the bending section and the second lens group, even more smooth movement becomes possible.

Furthermore, because a coupling portion with the first driving mechanism is formed on one surface of the coupling plate, and a coupling portion with the second driving mechanism is formed on the other surface, a more compact structure and smoother movement can be achieved.

In the lens unit having a first lens group which is arranged in the first optical axis direction, on which a light flux from an object is incident and a second lens group that is positioned closer to an image side than the first lens group and is arranged in the second optical axis direction; a bending section which is positioned between the first lens group and the second lens group and bends the first optical axis in the second optical axis direction, wherein the first lens group and the second lens group are movable in the respective optical axis directions at the time of zooming, and wherein a coupling member simultaneously drives a first drive mechanism which moves the first lens group and a second drive mechanism which moves the second lens group using drive force from one actuator, a moving mechanism for zooming can be provided in which the first lens group and the second lens group are moved with high precision and furthermore, because the moving mechanism for zooming has a simple structure, more compact lens unit and photographing apparatus can be provided.

What is claimed is:

1. A lens unit having a plurality of lens groups, comprising:
   (a) a first lens group arranged in a direction of a first optical axis of the lens unit, on which a light flux from an object is incident;
   (b) a second lens group arranged in a direction of a second optical axis of the lens unit and provided closer to an image side than the first lens group and;
   (c) a bending section provided between the first lens group and the second lens group, which bends the first optical axis in the direction of the second optical axis,
   wherein the first and second lens groups are movable in the respective optical axes when a zooming operation is carried out;
   (d) an actuator which drives the first and second lens groups;
   (e) a first drive mechanism which moves the first lens group;
   (f) a second drive mechanism which moves the second lens group; and
   (g) a coupling member which concurrently transmits drive force from the actuator to the first and second drive mechanisms.

2. The lens unit of claim 1, wherein the first lens group is moved without rotation, and the first drive mechanism comprises a drive member having a shape of an arm.

3. The lens unit of claim 1, wherein at least one of the first drive mechanism and the second drive mechanism is connected to the coupling member through a cam.

4. The lens unit of claim 1, wherein the coupling member comprises a support shaft and a coupling plate which rotates about the support shaft, and a rotation of the coupling plate causes drive force to the first and second drive mechanisms.

5. The lens unit of claim 4, wherein the support shaft is arranged between the bending section and the second lens group.

6. The lens unit of claim 4, wherein the coupling plate comprises a first connecting portion formed on one surface of the coupling plate, which is connected with the first drive mechanism, and a second connecting portion formed on the other surface thereof, which is connected with the second drive mechanism.

7. A photographing apparatus comprising the lens unit described in claim 1 and an image pickup element which receives a light introduced by the lens unit.

8. A lens unit comprising:
   (a) a first holding member arranged in a direction of a first optical axis of the lens unit, which holds a first lens group on which a light flux from an object is incident, and moves along the first optical axis when a zooming operation is carried out;
   (b) a second holding member arranged in a direction of a second optical axis of the lens unit and provided closer to an image side than the first lens group, which holds a second lens group, and moves along the second optical axis when the zooming operation is carried out;
   (c) a bending section provided between the first and second lens groups, which bends the first optical axis in the direction of the second optical axis;
   (d) an actuator provided on a side of the second optical axis, which drives the first and second holding members;
   (e) a first drive mechanism which moves the first holding member;
   (f) a second drive mechanism which moves the second holding member; and
   (g) a coupling member which transmits drive force from the actuator to the first and second drive mechanisms,
   wherein the first drive mechanism comprises an arm having a rotation axis that is provided closer to the image side than the bending section, one end of the arm is connected with the first holding member, the arm is rotated about the rotation axis by the drive force from the coupling member, and the first holding member moves along the first optical axis.

9. The lens unit of claim 8, wherein the first drive mechanism is connected with the coupling member through a cam.

10. The lens unit of claim 8, wherein the second drive mechanism is connected with the coupling member through a cam.

11. The lens unit of claim 8, wherein the first and second drive mechanisms are connected with the coupling member through a respective cam.

12. The lens unit of claim 8, wherein the coupling member comprises a support shaft and a coupling plate which rotates about the support shaft, and a rotation of the coupling plate causes drive force to the first and second drive mechanisms.

13. The lens unit of claim 12, wherein the coupling member further comprises a gear portion, and the drive force from the actuator is transmitted to the coupling member through the gear portion.

14. The lens unit of claim 11, wherein the support shaft is arranged closer to the image side than the bending section.

15. The lens unit of claim 12, wherein the coupling plate comprises a first connecting portion formed on one surface of the coupling plate, which is connected with the first drive mechanism, and a second connecting portion formed on the other surface thereof, which is connected with the second drive mechanism.

16. The lens unit of claim 8, wherein the first holding member comprises a square-shaped tubular frame.

17. A photographing apparatus comprising the lens unit described in claim 8 and an image pickup element which receives a light introduced by the lens unit.

* * * * *